(12) United States Patent
Gromfeld

(10) Patent No.: US 11,421,845 B2
(45) Date of Patent: Aug. 23, 2022

(54) LIGHT MODULE FOR MOTOR VEHICLE, AND LIGHTING AND/OR SIGNALING DEVICE PROVIDED WITH SUCH A MODULE

(71) Applicant: VALEO VISION, Bobigny (FR)

(72) Inventor: Yves Gromfeld, Angers (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 17/059,900

(22) PCT Filed: May 29, 2019

(86) PCT No.: PCT/EP2019/064107
§ 371 (c)(1),
(2) Date: Nov. 30, 2020

(87) PCT Pub. No.: WO2019/229191
PCT Pub. Date: Dec. 5, 2019

(65) Prior Publication Data
US 2021/0215313 A1    Jul. 15, 2021

(30) Foreign Application Priority Data

Jun. 1, 2018 (FR) ..................................... 18 54802

(51) Int. Cl.
| | | |
|---|---|---|
| F21S 8/00 | (2006.01) |
| F21S 41/26 | (2018.01) |
| F21S 41/24 | (2018.01) |
| F21S 41/143 | (2018.01) |
| F21S 43/245 | (2018.01) |
| B60Q 1/00 | (2006.01) |
| F21Y 115/10 | (2016.01) |

(52) U.S. Cl.
CPC ............ *F21S 41/26* (2018.01); *B60Q 1/0041* (2013.01); *F21S 41/143* (2018.01); *F21S 41/24* (2018.01);
(Continued)

(58) Field of Classification Search
CPC .......... F21S 41/26; F21S 41/24; F21S 43/245; F21S 41/143; F21S 43/235; F21S 43/236;
(Continued)

(56) References Cited

U.S. PATENT DOCUMENTS

| | | | |
|---|---|---|---|
| 10,400,974 B2 * | 9/2019 | Kanayama | ............ F21S 41/153 |
| 10,632,898 B2 * | 4/2020 | Chingyo | ................. F21S 41/24 |

(Continued)

FOREIGN PATENT DOCUMENTS

| | | |
|---|---|---|
| DE | 10 2010 016 633 A1 | 5/2011 |
| DE | 10 2010 056 313 A1 | 6/2012 |

(Continued)

OTHER PUBLICATIONS

International Search Report dated Jul. 1, 2019 in PCT/EP2019/064107 filed on May 29, 2019, 3 pages.
(Continued)

*Primary Examiner* — Omar Rojas Cadima
(74) *Attorney, Agent, or Firm* — Oblon, McClelland, Maier & Neustadt, L.L.P.

(57) ABSTRACT

The invention relates to a luminous module (1) comprising a first series of at least one illuminating unit associated with a projecting optical system (2) that is configured to produce a first exit beam from light output from the first series, the first beam forming a motor-vehicle lighting function, characterized in that it comprises a second series of at least one illuminating unit associated with the projecting system (2), the projecting system being configured to produce a second exit beam from light output from the second series, the second beam forming a motor-vehicle signaling function, and wherein the first and second series comprise exit dioptric interfaces (13) located in the same focal plane of the projecting system (2).

16 Claims, 2 Drawing Sheets

(52) U.S. Cl.
 CPC ......... *F21S 43/245* (2018.01); *F21Y 2115/10* (2016.08)

(58) Field of Classification Search
 CPC ...... F21S 43/237; F21S 43/241; F21S 41/255; F21S 41/322; F21S 41/25; F21S 41/275; F21S 41/265; F21S 41/295; F21S 43/249; F21S 41/148; F21S 43/243; F21S 43/315; B60Q 1/0041; B60Q 1/2607; B60Q 1/30; B60Q 1/34; B60Q 1/44; F21Y 2115/10; F21V 5/00; F21V 5/02; F21V 5/04; F21W 2103/00; F21W 2103/10; F21W 2103/20; F21W 2103/35; F21W 2107/10
 See application file for complete search history.

(56) References Cited

U.S. PATENT DOCUMENTS

| | | | |
|---|---|---|---|
| 2011/0110111 A1 | 5/2011 | Rho | |
| 2014/0175978 A1* | 6/2014 | Kobayashi | F21S 41/18 315/82 |
| 2016/0033101 A1 | 2/2016 | Yan et al. | |
| 2016/0252226 A1* | 9/2016 | Shih | F21S 43/243 362/511 |
| 2019/0203907 A1* | 7/2019 | Lefaudeux | F21K 9/60 |

FOREIGN PATENT DOCUMENTS

| | | |
|---|---|---|
| DE | 102010056313 A1 | 6/2012 |
| EP | 2 711 611 A1 | 3/2014 |
| EP | 2 713 097 A1 | 4/2014 |
| EP | 2 816 277 A1 | 12/2014 |
| JP | 2016126948 A * | 7/2016 ........... G02B 6/0091 |

OTHER PUBLICATIONS

Chinese Office Action dated Feb. 28, 2022 issued in Chinese Patent Application No. 201980036637.7 with English summary translation thereof, 10 pages.

* cited by examiner

LIGHT MODULE FOR MOTOR VEHICLE, AND LIGHTING AND/OR SIGNALING DEVICE PROVIDED WITH SUCH A MODULE

The present invention especially relates to a luminous motor-vehicle module, and to a lighting and/or signaling device equipped with such a module.

A preferred application is in the automotive industry, to the equipment of vehicles, in particular with a view to producing devices capable of emitting light beams, which are also referred to as lighting and/or signaling functions, in general meeting regulations. For example, the invention may allow a segmented light beam, especially for signaling and/or participating in lighting functions at the front of a vehicle, to be produced. A beam the projection of which forms a mark composed of beam segments, each segment being able to be lit up independently, is referred to as a segmented beam.

The signaling and/or lighting lamps of motor vehicles are luminous devices that comprise one or more light sources and an outer lens that closes the lamp. In simple terms, the light source emits light rays to form a light beam that is directed toward the outer lens in order to produce an illuminated zone that transmits the light outside of the vehicle. These functions must meet regulations, especially as to their light intensity and angles of visibility.

Known lighting modules have, up to now, been intended to emit light for performing one lighting function, for example:
- a downward-directed low beam, sometimes also called a dipped beam, used if there are other vehicles on the road;
- a high beam devoid of cut-off, and characterized by a maximal illumination along the axis of the vehicle;
- a lighting beam for when it is foggy, characterized by a flat cut-off and a large illumination width.

Signaling modules have, up to now, been intended to emit light for performing one signaling function, for example:
- a front or rear position-light beam (position lights also being known as parking lights) also able to be used for signaling purposes in urban areas, such a beam also being referred to as a town beam or dim-dip beam;
- a beam for indicating changes in direction, such a beam also being referred to as an indicator light;
- a daytime running light (DRL);
- a beam indicating activation of the brakes or stop light;
- a rear fog light, which makes it possible to be seen by following vehicles when it is foggy.

In general, the light intensity of a signaling function is strictly lower than that of a lighting function.

These functions may involve projection in front of or behind the vehicle.

Recently, technologies allowing a segmented beam, also called a pixel beam, to be produced with a view to performing lighting functions have been developed. This is especially the case with "matrix beam" lighting functions, which are generally based on a plurality of illuminating units each comprising one light-emitting diode, which diodes may be driven individually. The beam, which results from the various beam segments generated by each of the diodes, is projected by means of a projecting optical system generally comprising one or more lenses.

The flexibility with which such a beam may be controlled is widely appreciated by motor-vehicle manufacturers. In contrast, it is an extra lighting element, in addition to the other lighting or signaling elements.

The present invention aims to at least partially remedy the drawbacks of current techniques.

The present invention relates, according to one aspect, to a luminous module comprising a first series of at least one illuminating unit associated with a projecting optical system that is configured to produce a first exit beam from light output from the first series, the first beam forming a motor-vehicle lighting function.

Advantageously, the module comprises a second series of at least one illuminating unit associated with the projecting system, the projecting system being configured to produce a second exit beam from light output from the second series, the second beam forming a motor-vehicle signaling function, and wherein the first and second series comprise exit dioptric interfaces located in the same focal plane of the projecting system.

Thus, the projecting optical system (which may for example comprise one or more lenses) is used to provide two functions and is illuminated in both cases, this system thus remaining turned on when the two functions are switched between. Typically, the exit face of the projecting system (for example the external face of a projecting lens) remains visible and illuminated even if the lighting command of the device is changed. In one preferred case, the lighting function is a high-matrix-beam function that participates in a high beam in combination with a low-beam module. The signaling function may be a position light.

Whereas the prior art suggests that lighting functions and signaling functions are, in essence, distinct and therefore to be treated separately, the present invention combines them. Specifically, the luminous powers employed in each case are often very different and hence combining these functions is an unconventional thing to do.

According to another aspect, the present invention also relates to a motor-vehicle lighting and signaling device equipped with at least one luminous module such as described above, and preferably at least two modules. Advantageously, the projecting optical system of each module comprises at least one projecting lens common to at least two modules, or even to all the modules.

The present invention also relates to a vehicle equipped with at least one module and/or one device according to the present invention. In particular, two devices that are spaced apart laterally at the front of the vehicle may be used.

According to one particularly advantageous embodiment, the second series comprises at least one light source and one optical element configured to transmit light from the at least one light source to the projecting system.

Preferably, the optical element comprises at least one waveguide. This allows a propagation of light capable of distributing the light over a relatively large dioptric exit area, while limiting the light intensity produced for the second beam, to be achieved.

According to one possibility, the optical element comprises a plurality of waveguides and an optical coupler configured to distribute the light output from the at least one light source to the plurality of waveguides. The light is thus directed into a plurality of waveguides. According to one possibility, the coupler forms an integral portion of the part forming the waveguides, this allowing a very rationalized element to be produced.

Optionally, the coupler may be located at one end of the waveguides.

In one embodiment, the first series comprises a plurality of light sources and a plurality of lenses each associated with a different one of said light sources and each configured to transmit the light of the associated light source to the projecting system.

According to one nonlimiting possibility, the plurality of lenses is formed on a first waveguide of the at least one waveguide. Thus, the optical part in question performs a complex function and it is not necessary to employ a different optical element for the lighting functions and the signaling functions.

Optionally, the first waveguide is located between two other waveguides of the plurality of waveguides.

Optionally, the first waveguide comprises, for each lens, an entrance dioptric interface for light output from the associated light source, and separating notches each located between two adjacent entrance dioptric interfaces.

Preferably, the notches are configured to form a surface for reflecting light rays output from the second series. Thus, the notches serve both as separators separating the entrance dioptric interfaces of each of the lenses and as internal reflecting surfaces allowing light to be redirected along the waveguides.

According to one possibility, the light sources of the first series and of the second series are borne by the same circuit board. This clearly simplifies the overall design of the device.

Advantageously, the light sources of the first series and of the second series are aligned. The layout of the circuit board is thus simplified.

According to one possibility, the lighting function is a high-matrix-beam function.

According to one possibility, the signaling function is a position-light or direction-indicator function.

In one embodiment, the projecting optical system comprises a lens for compensating field curvature and an exit lens.

Advantageously, the following options may alternatively be implemented in any combination thereof:
  The light rays output from at least one waveguide and those output from the lenses propagate directly, without intermediate element, to the projecting system;
  The plurality of waveguides comprises two waveguides formed symmetrically about the first waveguide;
  The at least one waveguide is horizontal.
  The second series comprises a single light source. It may be centered on the coupler;
  The coupler comprises three first reflecting surfaces for total-internal reflection of the light output from the light source and then other surfaces for reflecting the light toward the exit dioptric interface of the waveguides;
  The light sources are light-emitting diodes;
  The first optical elements form an assembly unitarily formed with a one-piece part made of a single material.

In one preferred embodiment, the module is configured to project first and second light beams in front of a motor vehicle.

Other features and advantages of the present invention will be better understood with the aid of the exemplary description and the drawings, in which.

Figure 1:
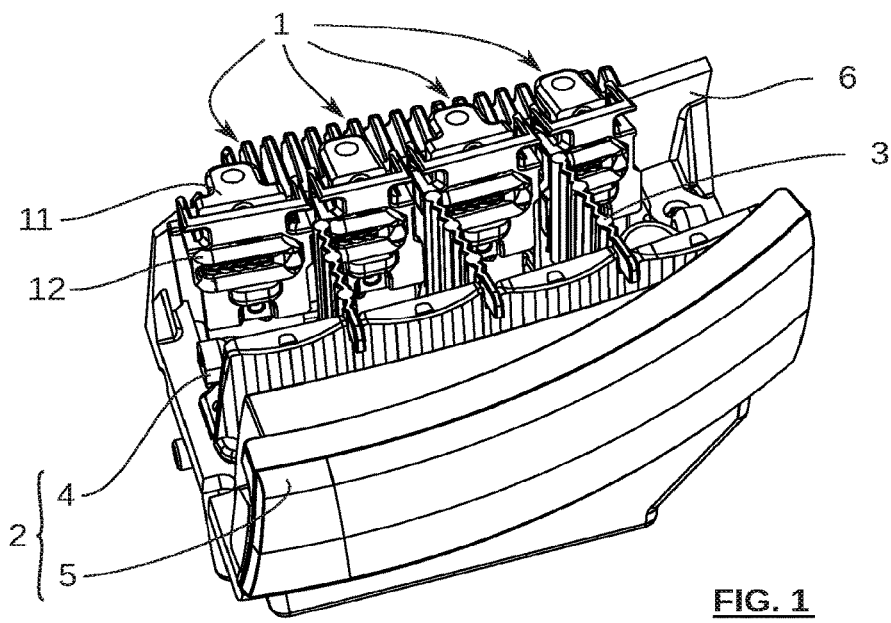
FIG. 1 shows, in perspective, one embodiment of a device of the invention incorporating four modules.

Unless specified otherwise, technical features that are described in detail for one given embodiment may be combined with technical features that are described in the context, other embodiments are described by way of nonlimiting example.

With respect to the features described below, terms relating to verticality, horizontality and transversality (or even the lateral direction), or equivalents thereof, are to be understood with respect to the position in which the lighting module is intended to be fitted in a vehicle. The terms "vertical" and "horizontal" are used in the present description to designate, regarding the term "vertical", a direction with an orientation perpendicular to the plane of the horizon (which corresponds to the height of the modules), and, regarding the term "horizontal", a direction with an orientation parallel to the plane of the horizon. They are to be considered under the conditions of operation of the device in a vehicle. The use of these words does not mean that slight variations about the vertical and horizontal directions are excluded from the invention. For example, an inclination relative to these directions of about + or −10° is here considered to be a minor variation about the two preferred directions.

In the following description, a device is a set of components forming a coherent system, in particular one borne by the same chassis, and capable of being mounted on a motor vehicle, at the front or at the rear. It may comprise one or more modules of the invention; these modules are preferably, at least partially, composed of a carrier of light sources. The invention may assign a pair of devices to a vehicle, in general in order to equip a right side and a left side of the front or of the rear of the vehicle.

At the very least, the module of the invention incorporates a first series of illuminating units allowing a segmented beam to be generated, but also preferably at least one other beam to be projected via at least one other series of illuminating units. The module of the invention may therefore be complex and associate a plurality of types of illuminating units, which may furthermore optionally share components. In particular, one advantageous embodiment makes provision to combine, between the two illuminating series, certain elements that may be chosen from: light sources and optical elements. Thus, the expressions "first series" and "second series" must not be understood to mean technical means that are systematically separate and distinct.

Optionally, the invention may participate in the production of a high beam. The function of the basic high beam is to illuminate a large extent of the scene in front of the vehicle, but also to provide illumination to a substantial distance, typically about two-hundred meters. This light beam, due to its lighting function, is mainly located above the horizon line. It may for example have a slightly upward sloping lighting optical axis. In particular, the first series of illuminating units, which will be described below, may be used to generate a "matrix beam" lighting function that forms a segment of a high beam, which segment is complementary to that produced by a near-field beam, the matrix beam seeking entirely, or at least mainly, to illuminate above the horizon line whereas the near-field beam (which may have the specificities of a low beam) seeks to illuminate entirely, or at least mainly, below the horizon line.

The device may also be used to form other lighting functions via or in addition to those described above.

As regards the signaling functions, one embodiment of the invention relates to a position-light function. The latter may have the following specificities such as defined in ECE Regulation 48, which was in force at the date of filing of the present patent application:

As indicated above, one advantage of the present invention is that a first beam performing a lighting function and a second beam performing a signaling function are produced within the same module 1. Illuminating units generate these first and second beams. Furthermore, the two types of illuminating units share the same projecting system 2; their exit dioptric interface is thus positioned in the object focal plane of the projecting system 2.

FIG. 1 shows one embodiment of the invention comprising four luminous modules 1. Nonlimitingly, the modules 1 may be spaced apart laterally from one another, especially via a separating partition 3 that extends toward the front of the modules 1. The invention potentially comprises a plurality of modules 1 each allowing at least one type of unitary beam to be emitted. They are preferably juxtaposed, i.e. arranged in a horizontal direction of alignment. The term module does not mean that the modules are necessarily completely distinct members; they must be understood simply to be members for forming distinct beams; they may share common portions, such as a general holder 6, a projecting optic 2 or electronic elements, control elements for example. Apart from the luminous modules 1, the device of the invention may incorporate modules of other types with a view to producing other functions.

Each luminous module 1 preferably comprises a carrier 11 bearing an optical element 12 and a printed circuit board comprising means for controlling the turning on of at least one (but preferably a plurality of) light source(s), which may be borne by the board itself. The light sources are positioned so as to each generate a light flux that enters into the optical element 12, from which a projection of light, here in the direction of an optical element 4 for compensating field curvature (which may be a biconvex lens), and then of an exit optical element 5 (also preferably a lens), results. The optical element 4 for compensating field curvature is defined so as to compensate for the field aberration generated by the exit optical element 5. The latter is preferably common to the various modules 1. The combination of the optical element 4 for compensating field curvature and of the exit optical element 5 forms, in the case shown, a projecting optical system 2. In the case where a plurality of modules 1 are juxtaposed, at least one portion of the projecting optical system 2, and for example the exit optical element 5, is unique to all the modules.

The projecting system 2 receives light from an upstream portion of the module 1 that comprises the at least one first illuminating unit and at least one second illuminating unit. Each illuminating unit comprises a light source. As known per se, the present invention may use light-emitting diodes (also called LEDs) as light sources. It may potentially be a question of one or more organic LEDs. In particular, these LEDs may be equipped with at least one chip in a semiconductor technology and able to emit a light intensity that advantageously is adjustable depending on the lighting and/or signaling function to be produced.

Moreover, the expression "light source" is here understood to mean a set of at least one elementary source such as an LED able to produce a flux leading at least one light beam to be output from the module of the invention.

In one advantageous embodiment, the exit face of the source is of rectangular cross section, this being typical for LED chips.

Figure 6:
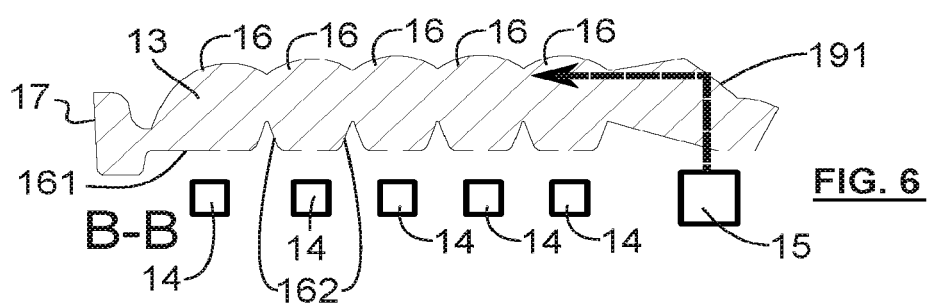
FIG. 6 is a cross-sectional view cut along the line BB of FIG. 4.
Figure 7:
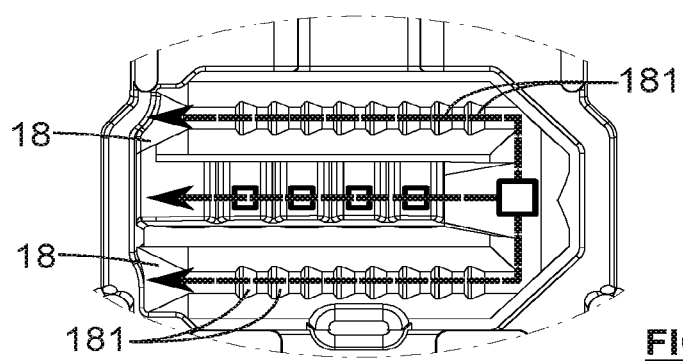
FIG. 7 shows a module of the invention via its back face.

Preferably, as shown in FIG. 6, the light sources are organized into rows. In particular, a first row of first light sources 14 that are each used, in conjunction with a first optical element here comprising a plurality of lenses 16, and preferably micro-lenses, each associated with one source 14, to produce the first beam has been shown, these sources and elements together forming a first illuminating unit. A second series of the light sources 15 (in the case of FIG. 6, the second series comprises only a single source 15) which is used, in conjunction with a second optical element, to produce the second beam, may also be seen, this series and element together forming a second illuminating unit. Nonlimitingly, the light sources 15 may be aligned relative to the one or more light sources 14. In FIG. 6, to differentiate the source 15 from the sources 14, the source 15 has been shown larger. However, the present invention makes no assumptions as to the actual size of the source 15 relative to the other sources 14. For convenience, it is moreover possible to use the same type of source, and especially the same type of LED, for all the sources. However, since it is a question of a signaling function, the one or more sources 15 may optionally have an overall luminous power lower than the overall luminous power of the sources 14. To achieve this, LEDs of different types may be chosen and/or a higher number of sources 14 than sources 15 provided.

Returning to FIGS. 2 and 3, an advantageous configuration of the optical element 12 is shown. The three-branch shape illustrated in these figures performs the function of the optical element of the first illuminating units (it comprises lenses 16 to this end) and, at the same time, the function of the optical element of the second illuminating unit (by virtue of waveguides: a first waveguide 17, and here two additional waveguides 18). It may be a question of a unitary part made of a single optical material, polymethyl methacrylate for example. It will be noted that in the embodiment shown, the portion forming the first waveguide 17 also forms the lenses 16. This arrangement is however nonlimiting and it is especially possible to form the optical portion featuring the one or more waveguides and the optical portion featuring the lenses 16 separately.

The lenses 16 are preferably juxtaposed side-by-side in the direction of the width of the beam to be produced. Each lens 16 advantageously has an exit face forming one portion of said other exit face of the first series of illuminating units.

The waveguides 17, 18 are, in the illustrated case, superposed, in a direction perpendicular to the direction of the width of the beam output from the first series of illuminating units. It will be noted that it is not necessary to employ a plurality of waveguides. A single one may suffice, especially when it is located in the very body of the optical portion used to form the lenses 16.

Figure 2:
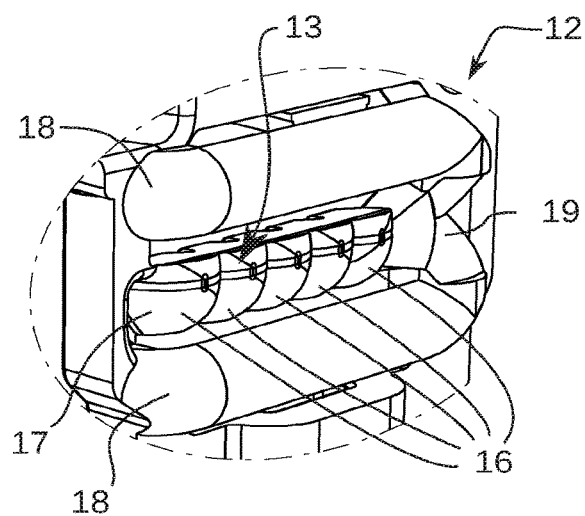
FIG. 2 shows, in more detail, a first perspective view of a front face of a module integrated into the embodiment of the invention of FIG. 1.
Figure 3:
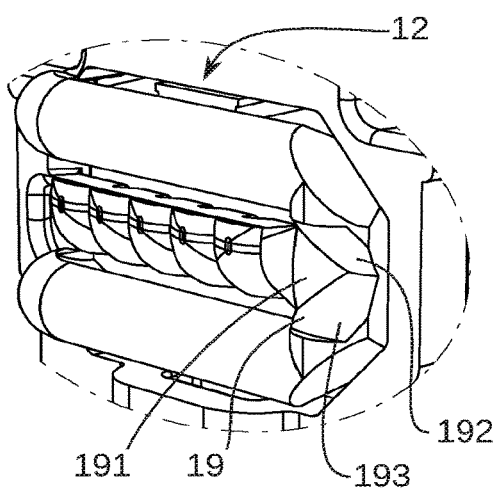
FIG. 3 shows an alternative perspective view to that of FIG. 2.

It will be noted that, in the figures, especially FIGS. 2 and 3, the exit surface of the guides 17, 18 is in the same plane (to within manufacturing tolerances) as the exit surface of the lenses 16; in the case of the guide 17, the exit surface is moreover formed, at least partially, by the exit surface of the lenses 16. The plane containing the exit dioptric interface 13 of the optical element 12 is preferably perpendicular to the optical axis of the module and/or parallel to an entrance dioptric interface of the optical system 2 (for example the lens 4 for compensating field curvature).

Generally, the optical element 12, comprising the exit dioptric interfaces of the waveguides and of the lenses, is configured so that the projecting optical system 2 is usable in common by the waveguides and the lenses. The distance separating, along the optical axis, on the one hand, the entrance dioptric interface of the projecting system 2, and, on the other hand, the exit of the waveguides and the exit of the lenses, is therefore identical.

Advantageously, as is the case in the embodiment shown in the various figures, the second illuminating unit comprises means allowing light output from the second source 15 to be propagated into the one or more waveguides. To achieve this, while, as shown in FIG. 6, the second source 15 is advantageously aligned with the sources 14 and preferably borne by the same circuit-board carrier, the module comprises a member configured to direct the light flux exiting from the light source 15 in the longitudinal direction of the one or more waveguides 17, 18. This member may in particular comprise reflecting surfaces that serve to steer light from the exit face of the source 15 into the guides.

In the case of an optical element 12 comprising three waveguides 17, 18, as shown in FIGS. 2 and 3, these reflecting surfaces are formed by a coupler 19 equipped, as the reference numbers in FIG. 3 indicate, with three reflecting surfaces 191, 192, 193. The distribution of light that results is reflected onto the light paths (represented by arrows) indicated in FIGS. 4 to 7.

Figure 4:
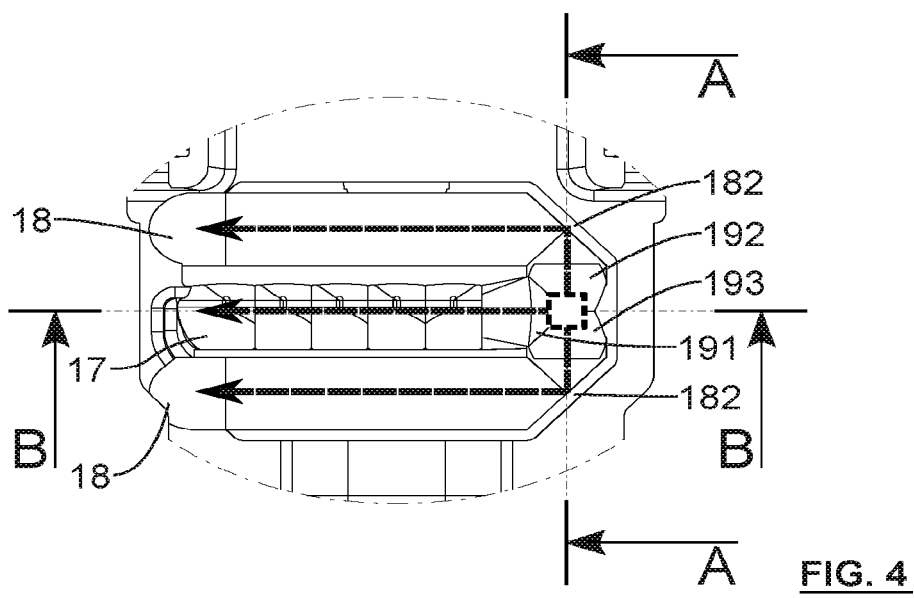
FIG. 4 shows a face-on view of the front face of a module of the invention.

Thus, in FIG. 4, one portion of the light output from the light source 15 is directed toward the first waveguide 17 by virtue of the surface 191, whereas another portion of the light reaches the additional waveguides 18 via the surfaces 192, 193. With respect to the latter surfaces, the pair thereof advantageously furthermore comprises second reflecting surfaces 182, causing an additional reflection, so as to direct the flux in the longitudinal direction of the guides 18. On account of the reflections to be achieved, it is advantageous for the reflecting surfaces to be oriented at 45° relative to the average direction of the light to be reflected. Preferably, the coupler 19 is a segment of the optical element itself, and advantageously integral therewith.

Figure 5:
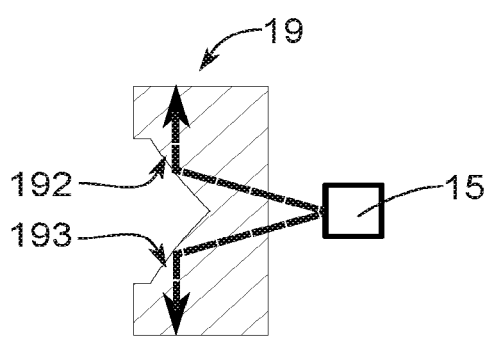
FIG. 5 is a cross-sectional view cut along the line AA of FIG. 4.

The reflection achieved downstream of the light source 15 is more particularly illustrated in FIG. 5, in which the polyhedral shape of the external face of the coupler may be seen. The surfaces 192 and 193 are advantageously angularly offset by 90°. Advantageously, the changes of direction of the light in the coupler 19 and in the one or more waveguides 17, 18, are achieved via internal reflection. The refractive indices of the materials in question and the angles of the light rays are configured to produce this internal reflection, which is preferably total. Alternatively, either or both of the reflections may be achieved via a reflective surface forming a mirror.

FIG. 6 for its part shows the reflection of light from the source 15 in the direction of the first waveguide 17. The light enters into the coupler 19 and is reflected by the surface 191 so as to follow an average direction that is oriented along the length of the guide 17.

FIG. 6 also illustrates the sources 14 interacting with the optical element, which forms both the guide 17 and the lenses 16. The latter each comprise an entrance dioptric interface 161 allowing light from the sources 14 to be admitted into the lens 16. So as to singulate the dioptric interfaces 161, the latter may be separated by notches 162, beveled notches for example, forming recesses along the waveguide 17. The exit face of the lens 16 is moreover advantageously curved (convex curvilinear shape) to form the corresponding portion of the exit dioptric interface 13.

It will be understood that the average direction of emission of the sources 14 and the average direction of propagation inside the micro-lenses 16 from the sources 14 are preferably directed depthwise from the rear to the front of the module 1, i.e. along the optical axis of the module 1. In contrast, the light output from the coupler 19 is introduced in the waveguides 17, 18 in a direction perpendicular to the optical axis. It is then gradually redirected along the longitudinal direction of each waveguide so as to reach the exit dioptric interface 13. This redirection is preferably achieved via impact of the light on surfaces that are inclined relative to the longitudinal direction of the guide in question.

Thus, in the case of the first waveguide 17, FIG. 6 shows that the notches 162 form obstacles to the longitudinal propagation of the light output from the source 15; when it interferes with these notches 162, the light is redirected with a different angle, producing an emission of light by the dioptric interface 13. In the case of the other waveguides 18, reliefs, for example taking the form of striations 181, are used to achieve the redirection function. It will be understood that this arrangement allows the light to be distributed along the exit dioptric interface 13. Thus, the light-intensity level of the signaling function produced with the at least one second source 15 may easily be minimized. It is possible to achieve much lower levels than would be obtained by driving one or both of the first sources 14 with the lowest possible power.

In operation, when a lighting beam is to be produced, at least all or some of the sources 14 are activated. Insofar as a high lighting level is generally sought for this type of function, it is also possible, although not necessary, to in addition activate at least one of the sources 15. When a signaling beam is to be produced, the sources 14 are turned off and only at least one of the sources 15 is active. The module 1 is preferably equipped with a control unit configured to control the activation and deactivation, and preferably the power level, of each source 14, 15. This control is preferably achieved at least on the basis of a parameter related to the nature of the lighting or signaling function to be produced.

The invention is not limited to the described embodiments but encompasses any embodiment according to the spirit thereof.

REFERENCES

1. Luminous module
   11. Carrier
   12. Optical element
   13. Exit dioptric interface
   14. Light source
   15. Light source
   16. Lens
      161. Entrance dioptric interface
      162. Notch
   17. First waveguide
   18. Additional waveguide
      181. Reflecting relief
      182. Second reflecting surface
   19. Coupler
      191. First reflecting surface
      192. Additional reflecting surface
      193. Additional reflecting surface
2. Projecting optical system
3. Separating partition
4. Optical element for compensating field curvature
5. Exit optical element
6. Carrier

The invention claimed is:

1. A luminous module comprising:
a first series of one illuminating unit associated with a projecting optical system that is configured to produce a first exit beam from light output from the first series, the first exit beam forming a motor-vehicle lighting function,
wherein the first series comprises a plurality of first light sources and a first optical element which comprises a plurality of lenses each associated with a different one of said first light sources and each configured to transmit the light of the associated first light source to the projecting system, and
a second series of another illuminating unit associated with the projecting system, the projecting system being configured to produce a second exit beam from light output from the second series, the second exit beam forming a motor-vehicle signaling function, wherein:
the first and second series comprise exit dioptric interfaces located in the same focal plane of the projecting system,
the second series comprises a waveguide configured to guide light in a light guiding direction along the exit dioptric interfaces, and
the waveguide is configured to direct light from the light guiding direction to an exit direction of the second series which comprises the waveguide, the exit direction intersecting with the light guide direction, and
wherein the waveguide includes striations configured to direct the light from the light guiding direction to the exit direction of the second series.

2. The luminous module as claimed in claim 1, wherein the second series comprises at least one second light source and a second optical element configured to transmit light from the at least one second light source to the projecting system.

3. The luminous module as claimed in claim 2, wherein the second optical element comprises the waveguide.

4. The luminous module as claimed in claim 3, wherein the second optical element comprises a plurality of waveguides including the waveguide and an optical coupler configured to distribute the light output from the at least one second light source to the plurality of waveguides.

5. The luminous module as claimed in claim 4, wherein the optical coupler is located at one end of the plurality of waveguides.

6. The luminous module as claimed in claim 5, wherein the plurality of lenses is formed on one waveguide of the plurality of waveguides.

7. The luminous module as claimed in claim 6, wherein the one waveguide is located between two other waveguides of the plurality of waveguides.

8. The luminous module as claimed in claim 7, wherein the one waveguide comprises, for each lens, an entrance dioptric interface for light output from the associated first light source, and separating notches each located between two adjacent entrance dioptric interfaces.

9. The luminous module as claimed in claim 8, wherein the separating notches are configured to form a surface for reflecting light rays output from the second series.

10. The luminous module as claimed in claim 2, wherein the plurality of first light sources and the at least one second light source are borne by the same circuit board.

11. The luminous module as claimed in claim 10, wherein the plurality of first light sources and the at least one second light source are aligned.

12. The luminous module as claimed in claim 1, wherein the motor-vehicle lighting function is a matrix-high-beam function.

13. The luminous module as claimed in claim 1, wherein the motor-vehicle signaling function is a position-light or direction-indicator function.

14. The luminous module as claimed in claim 1, wherein the projecting optical system comprises a lens for compensating field curvature and an exit lens.

15. A motor-vehicle lighting and signaling device comprising a plurality of the luminous modules as claimed in claim 1.

16. The motor-vehicle lighting and signaling device as claimed in claim 15, wherein the projecting optical system of each module comprises at least one exit lens common to at least two modules.

* * * * *